(12) United States Patent
Bouloy

(10) Patent No.: US 6,789,814 B1
(45) Date of Patent: Sep. 14, 2004

(54) AERODYNAMIC FRAME FOR A BICYCLE

(76) Inventor: Jose Bouloy, 519 SE. Euclid, Port St. Lucie, FL (US) 34983

( * ) Notice: Subject to any disclaimer, the term of this patent is extended or adjusted under 35 U.S.C. 154(b) by 0 days.

(21) Appl. No.: 10/421,423

(22) Filed: Apr. 23, 2003

(51) Int. Cl.$^7$ .................................................. B62K 9/00
(52) U.S. Cl. .................................................. 280/281.1
(58) Field of Search ........................... 280/281.1, 288.3, 280/288.2; D12/107, 101

(56) References Cited

U.S. PATENT DOCUMENTS

| | | | | |
|---|---|---|---|---|
| 2,537,325 A | * | 1/1951 | Bowden | .................. 280/288.3 |
| 3,233,916 A | * | 2/1966 | Bowden | ...................... 280/274 |
| 4,230,332 A | * | 10/1980 | Porsche | .................. 280/288.3 |
| D354,723 S | * | 1/1995 | Nelson | ....................... D12/108 |
| D369,330 S | * | 4/1996 | Hill et al. | ................... D12/111 |

* cited by examiner

*Primary Examiner*—Lesley D. Morris
*Assistant Examiner*—Paul Royal, Jr.

(57) ABSTRACT

An aerodynamic frame for a bicycle. A head tube extends from a main frame and mounts a front fork of the bicycle. A down tube depends from the main frame, bifurcates, and straddles a rear wheel of the bicycle. A pair of rear wheel stays extend from the down tube and straddle and mount the rear wheel of the bicycle and mount a pedal assembly of the bicycle. A seat tube extends from the main frame and mounts a seat of the bicycle. The main frame, the down tube, the pair of rear wheel stays, and the seat tube are streamlined airfoil-shaped for aerodynamics. A forwardmost facing surface of the head tube is vertically wedge-shaped for aerodynamics.

9 Claims, 3 Drawing Sheets

AERODYNAMIC FRAME FOR A BICYCLE

BACKGROUND OF THE INVENTION

1. Field of the Invention

The present invention relates to a frame for a bicycle. More particularly, the present invention relates to an aerodynamic frame for a bicycle.

2. Description of the Prior Art

Known prior art includes both traditional frame design, using traditional construction techniques and materials, and more recent innovative frame design, using new constructions techniques and materials.

Traditional frame design and construction were developed under relatively limited availability of materials. As steel was readily available, cost effective, and relatively easy to form into simple structural shapes, round steel tubes were found to be the most efficient structural element to use in bicycle frame manufacturing. The construction technique used included the cutting and fitting of these tubes, and brazing them together at their joints with or without joint lugs.

Since traditional frame design, was developed primarily under the availability of round straight steel tubes, it primarily employed a two triangle design, with a rear triangle to carry rider load, and to hold the rear wheel, and a front or main triangle that also carried rider load and joined the rear triangle to the head tube and front fork thereof; and a front fork also made of steel tubes. This was known as the safety bicycle.

From a structural standpoint the traditional two triangle design is essentially a very simple, short, open web truss. The top tube acts as a top boom, the down tube and rear wheel stays act as a bottom boom, and the seat tube and seat stays act as inclined interconnecting members between the top boom and the bottom boom, as in a typical open web truss of a bridge, for example.

A typical open web truss is comprised of a top boom, a bottom boom, and interconnecting vertical and/or inclined members between the two. When a vertical load force is applied to such an open web truss, the top boom is subjected to resultant compression forces, and the bottom boom is subjected to resultant tension forces, while the interconnecting members used to resist compression and sheer forces between the upper and lower booms may employ a combination of compression and tension members.

FIGS. 1A and 1B illustrate the similarities between the two structures by way of side view diagrams, and the directions of operative tension and compressive forces by arrows, with arrows pointing away from each other representing tension, and those point towards each other representing compression.

The simple open web truss that comprises the bicycle frame structure of the two triangle design is supported at each end with the axle of the wheels, in a way, similar to a bridge truss abutment; indirectly through the front fork in the front end, and directly in the rear. When a rider load is applied to the top of the bicycle it causes the top tube and seat stays to go into compression, and the down tube and rear wheel stays to go into tension, while the seat tube, and seat stays act as inclined compression and shear resistant members. The compressive and tensile strength characteristics of steel tubes, their availability and cost, and their workability, made them highly suitable for the two triangle design, and conversely made this design a very efficient and practical configuration, and most builders still use it with minor variations in the frame geometry.

Round steel tubes also work well to resist lateral and torsional flexes, and their ability to do so can be improved by such things as adding flutes, internal rifling, double and triple butting, and increasing their diameter. Such increases in strength were sought to improve performance and allow weight reduction.

An essential structural feature of this design, however, is that is includes vertical and inclined members, and their postures limit their ability to receive significant aerodynamic improvement, even though attempts were made to do so by reducing frontal area, by using oval and tear drop tube shapes, reducing front wheel size, sloping the top tube, and so on.

So, even though the traditional two triangle design has desirable features in stiffness, weight, and vertical load bearing capability, its limitations in aerodynamics, as well as the need for speed in the area of competitive cycling, have driven on the search for more aerodynamically efficient configurations.

Other materials that hay become more available, such as aluminum, titanium, and fiber reinforced composites, have provided builders with the opportunity to attempt new and innovative designs, that reduce frame weight and may offer significant improvements in aerodynamic efficiency.

While some bicycle frame builders have merely substituted tubes made of these materials for steel tubes, and gluing or welding of the joints in place of brazing in the traditional two triangle design, others have used these new materials, in particular, fiber reinforced composites, to produce new bicycle frame designs which are aerodynamically far superior.

While some of these new frames have greatly improved aerodynamics with their streamlined shapes and efficient configurations, they have the reputation of being heavy, flexible, and/or bouncy, and thus are thought to have greatly reduced riding characteristics compared to traditional steel frames. One reason for this is that some of these frames are, primarily, variants of the open web truss type construction, and employ traditional load bearing engineering principles. In addition, some of these innovative designs sometimes require complicated and costly construction techniques, as well as extensive mechanical adjustments. A superior design should address the aerodynamic efficiency, stiffness, strength, and weight requirements, of a bicycle frame simultaneously.

Numerous innovations for bicycle frames have been provided in the prior art that will be described. Even though these innovations maybe suitable for the specific individual purposes to which they address, however, they differ from the present invention.

FOR EXAMPLE, U.S. Pat. No. Des. 231,345 to Gutknecht teaches the ornamental design for a bicycle.

ANOTHER EXAMPLE, U.S. Pat. No. Des. 313,381 to Moeller teaches the ornamental design for a bicycle.

STILL ANOTHER EXAMPLE, U.S. Pat. No. Des. 389,787 to Zeigle et al. teaches the ornamental design for a bicycle frame having a unified rear triangle.

YET ANOTHER EXAMPLE, U.S. Pat. No. 6,017,048 TO Fritschen teaches a bicycle frame of efficient aerodynamic shaping including a main frame structure and fork assembly that employ an integral tension shell, strut and rib design, and integrated construction and assembly techniques, in which the structural components include a lightweight thin integral tension outer shell and lightweight thin inner integral tension struts and ribs arranged to use primarily their high tensile, and shear, but also lesser compression characteristics in combination to produce a very strong, aerodynamic, lightweight, and flex resistant bicycle.

It is apparent that numerous innovations for bicycle frames have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an aerodynamic frame for a bicycle that avoids the disadvantages of the prior art.

ANOTHER OBJECT of the present invention is to provide an aerodynamic frame for a bicycle that is simple to use.

BRIEFLY STATED, STILL ANOTHER OBJECT of the present invention is to provide an aerodynamic frame for a bicycle. A head tube extends from a main frame and mounts a front fork of the bicycle. A down tube depends from the main frame, bifurcates, and straddles a rear wheel of the bicycle. A pair of rear wheel stays extend from the down tube and straddle and mount the rear wheel of the bicycle and mount a pedal assembly of the bicycle. A seat tube extends from the main frame and mounts a seat of the bicycle. The main frame, the down tube, the pair of rear wheel stays, and the seat tube are streamlined airfoil-shaped for aerodynamics. A forwardmost facing surface of the head tube is vertically wedge-shaped for aerodynamics.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1A:
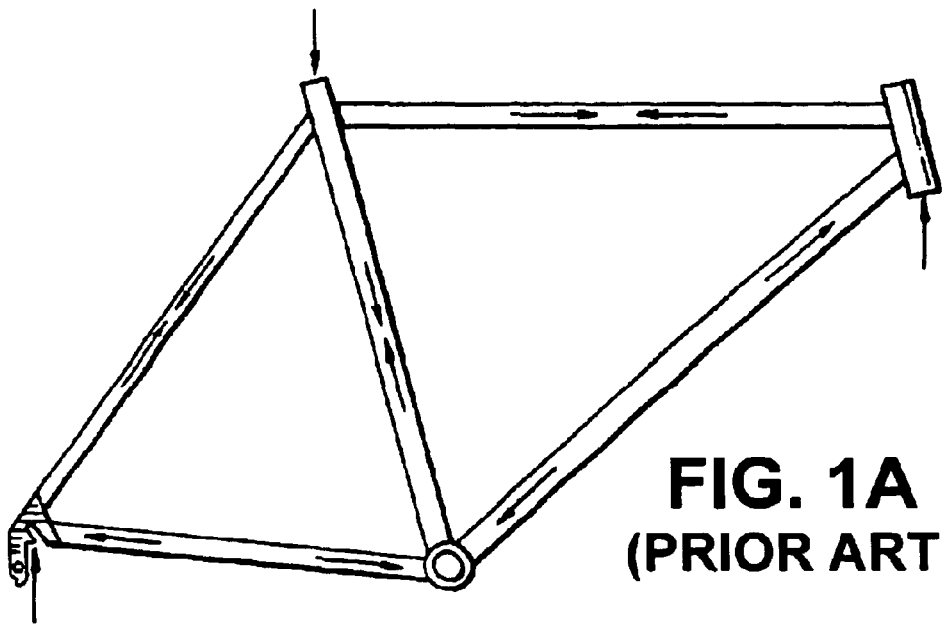
FIGS. 1A and 1B are load diagrams on a typical prior art bicycle frame.
Figure 1B:
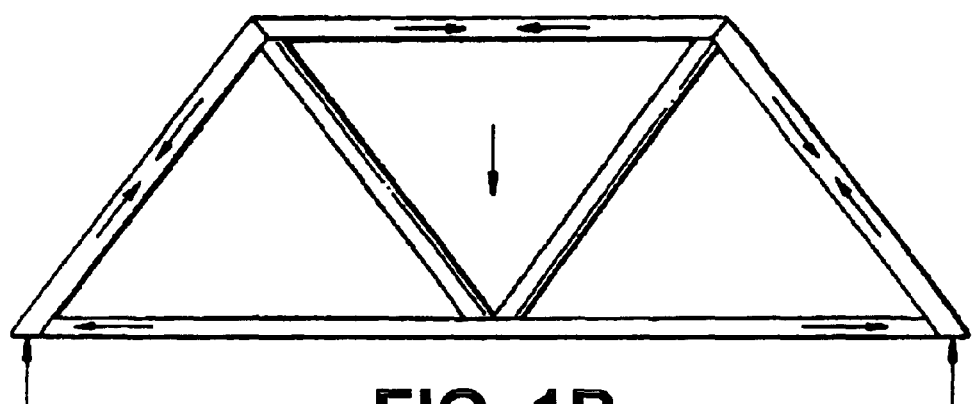

LIST OF REFERENCE NUMERALS UTILIZED IN THE DRAWING 10 aerodynamic frame of present invention for bicycle 12
12 bicycle
14 front fork assembly of bicycle 12
18 seat assembly of bicycle 12
20 rear wheel assembly of bicycle 12
22 pedal assembly of bicycle 12
24 main frame structure
26 head tube for mounting front fork assembly 16 of bicycle 12
28 down tube structure
30 pair of rear wheel stays for straddling and mounting rear wheel assembly 20 of bicycle 12 and for mounting pedal assembly 22 of bicycle 12
32 forwardmost end of main frame structure 24
34 rearwardmost end of main frame structure 24
36 uppermost end of down tube structure 28
37 gusset
38 pair of down tube structures of down tube structure 28 for straddling rear wheel assembly 20 of bicycle 12
40 pair of lowermost ends of pair of down tube structures 38 of down tube structure 28, respectively
42 pair of forwardmost ends of pair of rear wheel stays 30, respectively
44 pair of rearwardmost ends of pair of rear wheel stays 30, respectively
45 pair of gussets
46 pair of rear wheel receptors for mounting rear wheel assembly 20 of bicycle 12
48 bottom bracket sleeve for mounting pedal assembly 22 of bicycle 12
50 seat tube for mounting seat assembly 18 of bicycle 12
52 forwardmost facing surface of head tube 26 for aerodynamics

DETAILED DESCRIPTION OF THE INVENTION

Figure 2:
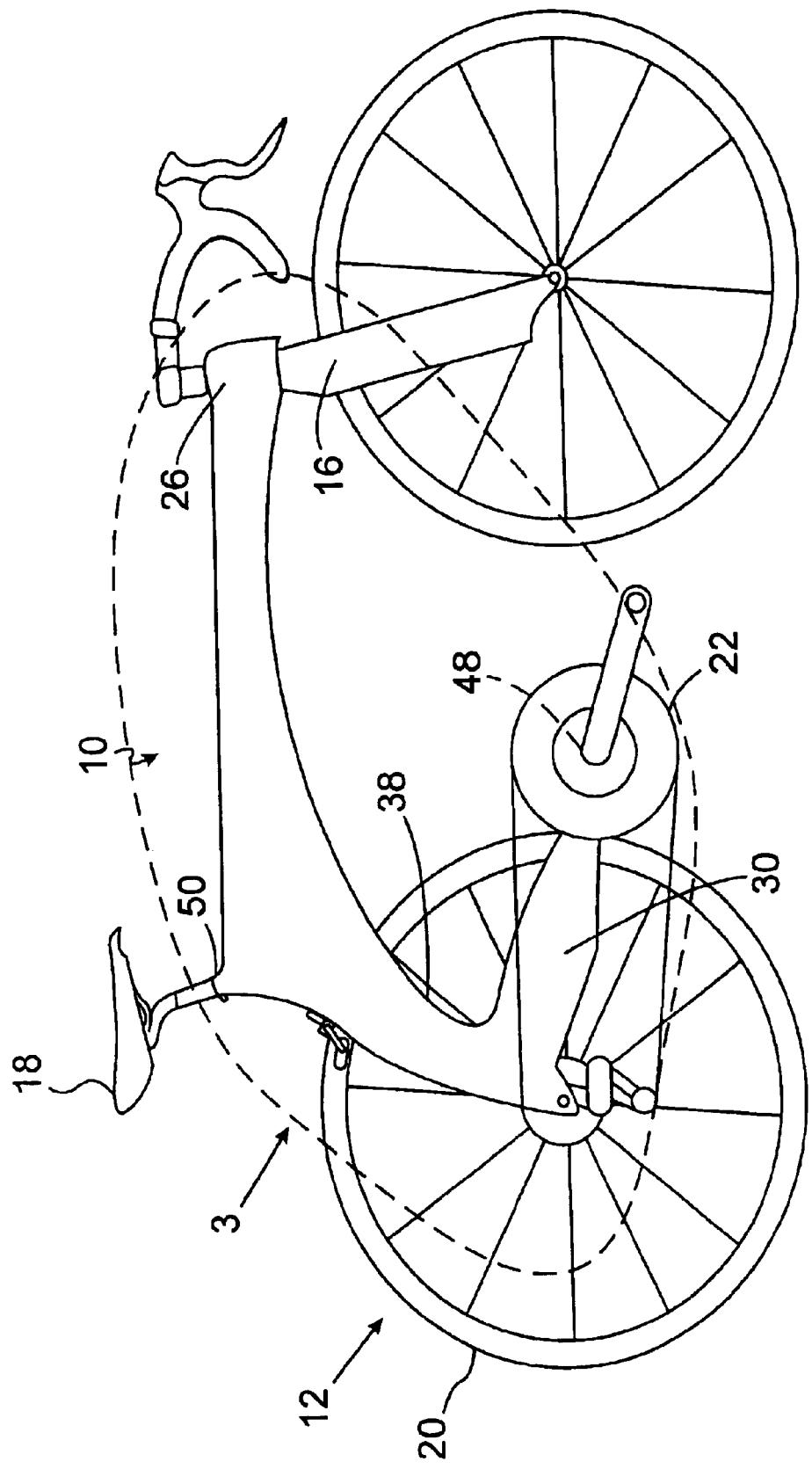
FIG. 2 is a diagrammatic side elevational view of the aerodynamic frame of the present invention utilized on a bicycle.

Referring now to the figures, in which like numerals indicate like parts, and particularly to FIG. 2, which is a diagrammatic side elevational view of the aerodynamic frame of the present invention utilized on a bicycle, the aerodynamic frame of the present invention is shown generally at 10 for a bicycle 12. The bicycle 12 has a front fork assembly 16, a seat assembly 18, a rear wheel assembly 20, and a pedal assembly 22.

Figure 3:
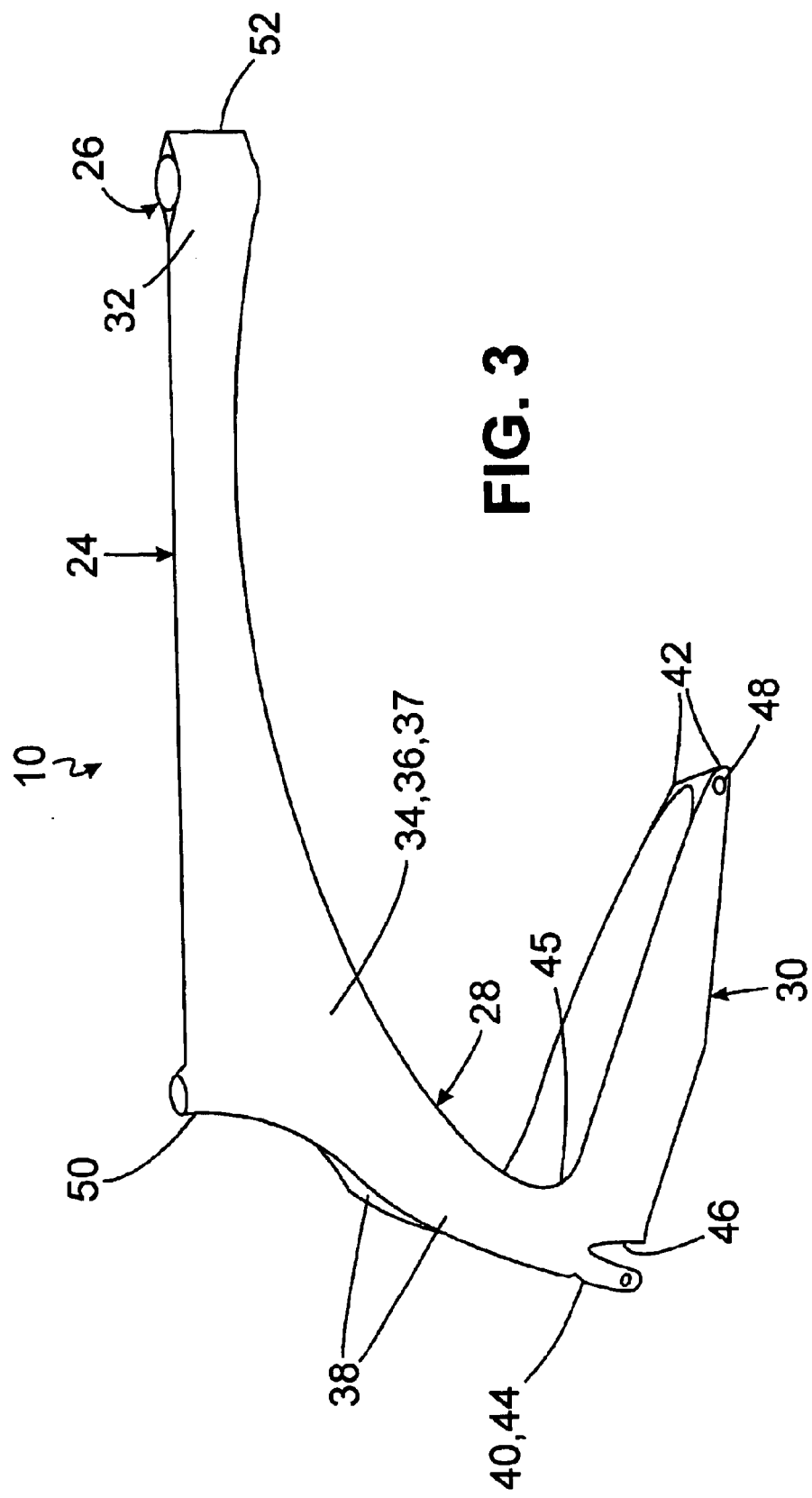
FIG. 3 is an enlarged diagrammatic perspective view of the area generally enclosed by the dotted curve identified by ARROW 3 in FIG. 2 of the aerodynamic frame of the present invention.

The configuration of the aerodynamic frame 10 can best be seen in FIG. 3, which is an enlarged diagrammatic perspective view of the area generally enclosed by the dotted curve identified by ARROW 3 in FIG. 2 of the aerodynamic frame of the present invention, and as such, will be discussed with reference thereto.

The aerodynamic frame 10 comprises a main frame structure 24, a head tube 26, a down tube structure 28, and a pair of rear wheel stays 30. The head tube 26 extends from the main frame structure 24 and is for mounting the front fork assembly 16 of the bicycle 12 (FIG. 2), the down tube structure 28 depends from the main frame structure 24, and the pair of rear wheel stays 30 extend from the down tube structure 28 and are for mounting the rear wheel assembly 20 of the bicycle 12 (FIG. 2) and the pedal assembly 22 of the bicycle 12 (FIG. 2).

The main frame structure 24 is slender, elongated, and generally horizontally-oriented, and has a forwardmost end 32 and a rearwardmost end 34.

The head tube 26 extends from the forwardmost end 32 of the main frame structure 24.

The down tube structure 28 has an uppermost end 36 that is coincident with the rearwardmost end 34 of the main frame structure 24, and forms therewith, a gusset 37. The down tube structure 28 depends skewly rearwardly from the uppermost end 36 thereof and bifurcates therefrom into a pair of down tube structures 38 that terminate in a pair of lowermost ends 40, respectively. The pair of down tube structures 38 of the down tube structure 28 are slender and elongated and spaced-apart from each other for straddling the rear wheel assembly 20 of the bicycle 12 (FIG. 2).

The pair of rear wheel stays 30 are slender, elongated, and generally horizontally-oriented, and have a pair of forwardmost ends 42, respectively, and a pair of rearwardmost ends 44, respectively. The pair of rearwardmost ends 44 of the pair of rear wheel stays 30 are coincident with the pair of lowermost ends 40 of the pair of down tube structures 38 of the down tube structure 28, respectively, and form therewith, a pair of gussets 45 and a pair of rear wheel receptors 46 for mounting the rear wheel assembly 20 of the bicycle 12 (FIG. 2) therebetween. The pair of rear wheel stays 30 are spaced-apart from each other for straddling the rear wheel assembly 20 of the bicycle 12 (FIG. 2).

The pair of rear wheel stays 30 extend forwardly from the pair of rearwardmost ends 40 thereof to the pair of forwardmost ends 42 thereof where that are joined to each other by a bottom bracket sleeve 48 disposed therebetween. The bottom bracket sleeve 48 is for mounting the pedal assembly 22 of the bicycle 12 (FIG. 2).

The aerodynamic frame 10 further comprises a seat tube 50. The seat tube 50 is stubby and extends upwardly and skewly rearwardly from the rearwardmost end 34 of the main frame structure 24 and is for mounting the seat assembly 18 of the bicycle 12 (FIG. 2).

The main frame structure 24, the down tube structure 28, the pair of rear wheel stays 30, the seat tube 50, the gusset 37, and the pair of gussets 45 are streamlined airfoil-shaped for aerodynamics.

The head tube 26 has a forwardmost facing surface 52 that is vertically wedge-shaped for aerodynamics.

It will be understood that each of the elements described above, or two or more together, may also find a useful application in other types of constructions differing from the types described above.

While the invention has been illustrated and described as embodied in an aerodynamic frame for a bicycle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An aerodynamic frame for a bicycle, comprising:
   a) a main frame structure;
   b) a head tube;
   c) a down tube structure;
   d) a pair of rear wheel stays; and
   e) a seat tube;
   wherein said head tube extends from said main frame structure;
   wherein said head tube is for mounting a front fork assembly of the bicycle;
   wherein said down tube structure depends from said main frame structure;
   wherein said pair of rear wheel stays extend from said down tube structure;
   wherein said pair of rear wheel stays are for mounting a rear wheel assembly of the bicycle;
   wherein said pair of rear wheel stays are for mounting a pedal assembly of the bicycle;
   wherein said main frame structure has a rearwardmost end;
   wherein said down tube structure has an uppermost end;
   wherein said uppermost end of said down tube structure is coincident with said rearwardmost end of said main frame structure;
   wherein said uppermost end of said down tube structure forms a first gusset with said rearwardmost end of said main frame structure;
   wherein said down tube structure depends skewly rearwardly from said uppermost end thereof into a pair of down tube structures;
   wherein said pair of down tube structures of said down tube structure terminate in a pair of lowermost ends, respectively;
   wherein said pair of rear wheel stays have a pair of rearwardmost ends, respectively;
   wherein said pair of rearwardmost ends of said pair of rear wheel stays are coincident with said pair of lowermost ends of said pair of down tube structures of said down tube structure, respectively;
   wherein said pair of rearwardmost ends of said pair of rear wheel stays form a pair of second gussets with said pair of lowermost ends of said pair of down tube structures of said down tube structure, respectively;
   wherein said seat tube is for mounting a seat assembly of the bicycle;
   wherein said main frame structure is streamlined airfoil-shaped for aerodynamics;
   wherein said down tube structure is streamlined airfoil-shaped for aerodynamics;
   wherein said pair of rear wheel stays are streamlined airfoil-shaped for aerodynamics;
   wherein said seat tube is streamlined airfoil-shaped for aerodynamics;
   wherein said first gusset is streamlined airfoil-shaped for aerodynamics; and
   wherein said pair of second gussets are streamlined airfoil-shaped for aerodynamics;
   wherein said head tube has a forwardmost facing surface; and
   wherein said forwardmost facing surface of said head tube is vertically wedge-shaped for aerodynamics.

2. The frame as defined in claim 1, wherein said main frame structure is slender;
   wherein said main frame structure is elongated; and
   wherein said main frame structure is generally horizontally-oriented.

3. The frame as defined in claim 1, wherein said pair of down tube structures of said down tube structure are slender;
   wherein said pair of down tube structures of said down tube structure are elongated; and
   wherein said pair of down tube structures of said down tube structure are spaced-apart from each other for straddling the rear wheel assembly of the bicycle.

4. The frame as defined in claim 1, wherein said pair of rear wheel stays are slender;
   wherein said pair of rear wheel stays are elongated;
   wherein said pair of rear wheel stays are generally horizontally-oriented; and
   wherein said pair of rear wheel stays are spaced-apart from each other for straddling the rear wheel assembly of the bicycle.

5. The frame as defined in claim 1, wherein said pair of rearwardmost ends of said pair of rear wheel stays form a pair of rear wheel receptors with said pair of lowermost ends of said pair of down tube structures of said down tube structure, respectively; and wherein said pair of rear wheel receptors are for mounting the rear wheel assembly of the bicycle therebetween.

6. The frame as defined in claim 1, wherein said pair of rear wheel stays have a pair of forwardmost ends, respectively;

wherein said pair of rear wheel stays extend forwardly from said pair of rearwardmost ends thereof to said pair of forwardmost ends thereof;

wherein said pair of forward most ends of said pair of rear wheel stays are joined to each other by a bottom bracket sleeve;

wherein said bottom bracket sleeve is disposed between to said pair of forwardmost ends of said pair of rear wheel stays, respectively; and wherein said bottom bracket sleeve is for mounting the pedal assembly of the bicycle.

7. The frame as defined in claim 1, wherein said seat tube is stubby.

8. The frame as defined in claim 1, wherein said seat tube extends upwardly from said rearwardmost end of said main frame structure; and wherein said seat tube extends skewly rearwardly from said rearwardmost end of said main frame structure.

9. The frame as defined in claim 1, wherein said main frame structure has a forwardmost end; and wherein said head tube extends from said forwardmost end of said main frame structure.

* * * * *